United States Patent
Bosia et al.

(10) Patent No.: US 12,283,395 B2
(45) Date of Patent: Apr. 22, 2025

(54) DEVICE FOR SEPARATING THE CORE AND THE SHEATH OF A CABLE AND METHOD FOR SEPARATING THE CORE AND THE SHEATH OF A CABLE

(71) Applicants: A3I, Donzère (FR); AGENCE NATIONALE POUR LA GESTION DES DÉCHETS RADIOACTIFS, Châtenay-Malabry (FR); MTB MANUFACTURING, Saint-Chef (FR); COMMISSARIAT À L'ENERGIE ATOMIQUE ET AUX ENERGIES ALTERNATIVES, Paris (FR)

(72) Inventors: Benjamin Bosia, Montcarra (FR); Laurent Margueritte, Montélimar (FR); Rémi Roos, Saulce sur Rhône (FR)

(73) Assignees: A3I, Donzére (FR); AGENCE NATIONALE POUR LA GESTION DES DÉCHETS RADIOACTIFS, Châtenay-Malabry (FR); MTB MANUFACTURING, Saint-Chef (FR); COMMISSARIAT AL'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 424 days.

(21) Appl. No.: 17/769,073

(22) PCT Filed: Oct. 14, 2020

(86) PCT No.: PCT/EP2020/078820
§ 371 (c)(1),
(2) Date: Apr. 14, 2022

(87) PCT Pub. No.: WO2021/074175
PCT Pub. Date: Apr. 22, 2021

(65) Prior Publication Data
US 2023/0197319 A1   Jun. 22, 2023

(30) Foreign Application Priority Data

Oct. 14, 2019 (FR) .................................. 1911428

(51) Int. Cl.
*H01B 15/00* (2006.01)
*H02G 1/12* (2006.01)

(52) U.S. Cl.
CPC ......... *H01B 15/006* (2013.01); *H02G 1/1217* (2013.01)

(58) Field of Classification Search
CPC ...... H02G 1/12; H02G 1/1217; H01B 15/006; Y02W 30/82
(Continued)

(56) References Cited

U.S. PATENT DOCUMENTS

| 4,809,566 A | 3/1989 | Campanella |
| 5,197,173 A * | 3/1993 | Stokes, Sr. ................ B09B 5/00 83/870 |
| 5,389,192 A * | 2/1995 | Takimoto ............. H02G 1/1256 30/286 |

FOREIGN PATENT DOCUMENTS

| CN | 106602478 B | 12/2017 |
| CN | 107482541 A | 12/2017 |

(Continued)

OTHER PUBLICATIONS

Jan. 18, 2021 International Search Report issued in International Patent Application No. PCT/EP2020/078820.

*Primary Examiner* — Hadi Shakeri
(74) *Attorney, Agent, or Firm* — Oliff PLC (57) ABSTRACT

A device for separating a core and sheath of cable includes an apparatus delivering the cable along cable feed axis parallel to longitudinal axis of cable. Two knives cut sheath to two portions mechanically dissociated from one another. Each knife cuts sheath over its whole thickness in radial (Continued)

cutting zone with respect to central axis of the cable. Two blockers extend the knives in the direction of the feed axis of the cable and keep the core in position along the feed axis of the cable. At least one ramp extends from each knife in a second direction perpendicular to the radial cutting zone and to the feed axis of the cable. The ramp has an outer surface extending away from the cable feed axis in the first direction when movement takes place in the feed direction of the cable to separate the core and the portions of the sheath.

14 Claims, 4 Drawing Sheets

(58) Field of Classification Search
USPC ............................................................ 7/107
See application file for complete search history.

(56) References Cited

FOREIGN PATENT DOCUMENTS

| ES | 1 060 073 U | 7/2005 |
| FR | 2 728 735 A1 | 6/1996 |
| GB | 460683 A | 2/1937 |

* cited by examiner

DEVICE FOR SEPARATING THE CORE AND THE SHEATH OF A CABLE AND METHOD FOR SEPARATING THE CORE AND THE SHEATH OF A CABLE

BACKGROUND OF THE INVENTION

The invention relates to devices for separating the core and the sheath of a cable and also to methods for separating the core and the sheath of a cable.

PRIOR ART

In a large number of activities, it is advantageous to be able to recycle the cables, in particular electric the cables, after use. Recycling requires the sheath and the core of the cable to be separated from one another. However, to be able to beneficiate the cable the core, it is important that the core be exempt of pollution. In use, the core is protected by the sheath that receives and stores pollution. This pollution must not be transferred when the core and the sheath are separated. The document CN107482541 proposes a method for cleaning polluted electric the cables before making a longitudinal cut. Cleaning is performed by rubbing between two pads. After the cleaning step, a single groove is formed along the sheath by means of a knife followed by a spreader. The spreader presses in pin-point manner on the groove to detach the sheath and the core. The sheath and the core are wound above one another so that if the sheath has not been correctly cleaned or crumbles, its pollution is transferred to the core. Furthermore, this configuration requires a manual initiation in order to separate the core and the sheath.

This problem is particularly present in the nuclear industry where the electric the cable is considered, in its totality, as nuclear waste whereas the core has never been placed in contact with any contaminating material. This results in a method such as the one presented in the document CN107482541 not being compatible with such a problem and not providing satisfactory results.

It is then advantageous to beneficiate the core of the electric the cable by separating the latter from the sheath and by taking care to prevent the contamination/pollution that may be present on the outer surface of the sheath from being transferred to the core, in all the stages of the treatment and more particularly when separation is performed.

Another solution is proposed in document FR2728735 that proposes to strip a cable polluted on its surface by radioactive substances. The cable the sheath is partially cut by means of a laser beam. This configuration enables the cutting means and the sheath to be physically separated to avoid polluting the laser source with radioactive substances. This solution proves not to be satisfactory. The risk of the radioactive contamination being transferred to the core is still present. In addition, it requires the energy of the laser beam to be adjusted very precisely according to the running speed of the cable and the composition of the sheath. Furthermore, the sheath is heated to make it easier to open by means of a frustum-shaped spreader thereby complicating the gouging operation of the sheath.

A requirement therefore exists to provide a device that is able to separate the core and the sheath of a cable while ensuring that any contamination that may be present on the outer surface of the sheath is not transferred to the core of the cable.

The document CN 106602478 discloses a device configured to cut the sheath of a cable by means of two knives mounted diametrically opposite one another around the cable. The cable is stressed laterally up-line from the knives to position the cable with respect to the knives. The cable slides on a groove so that the cable remains in position when the cutting step of the sheath takes place. On termination of the cutting operation, the cable passes through an open truncated cone to separate the sheath and the core. This solution is not acceptable for a cable that may be contaminated on its surface as the contaminated dust can migrate from the sheath to the core.

Document ES 1060073U describes a device configured to cut the sheath of a cable. The cable is inserted in a centring device adapted to the diameter of the cable enabling the cable to be positioned with respect to three radially mounted knives to cut the sheath. A separating element is fitted down-line from the knives to separate the sheath and the core. There again, it is apparent that this configuration does not prevent migration of contaminated dust from the sheath to the core after cutting has been performed.

OBJECT OF THE INVENTION

One object of the invention consists in remedying these shortcomings, and more particularly in providing a device for separating a core and a sheath of a cable that is able to reduce the rate of occurrence of a contact between the outer surface of the sheath and the core and transfer of possible pollution from the sheath to the core.

According to one feature of the invention, a device for separating a core and a sheath of a cable is proposed, comprising:

an apparatus configured to supply the cable along a feed axis parallel to the longitudinal axis of the cable up to an outlet passing between at least two knives,
  at least two knives being configured to cut the sheath over its whole thickness and to form at least two portions of the sheath mechanically dissociated from one another, each knife comprising a cutting front extending in a first radial direction with respect to the longitudinal axis of the cable to cut the sheath,
  at least two ramps extending from at least two knives, at least two ramps being configured to maintain the separation between at least two portions of the sheath and to mechanically separate the sheath and the core up to the outlet by modifying the movement path of at least two portions of the sheath differently with respect to the feed axis, and
  possibly at least two deflectors arranged down-line from at least two ramps to receive the portions of the sheath, at least two deflectors having an outer surface modifying the direction of movement of the portions of the sheath perpendicularly to the longitudinal axis of the core.

In advantageous manner, at least two knives comprise two knives having their cutting front in the same plane, said two knives being separated by a first separating distance, and the ramps have a contact surface designed to receive the portion of the sheath on outlet from the knives, the contact surface being oriented so as to move away from the longitudinal axis of the core when movement of the sheath takes place from up-line to down-line.

In a particular configuration, each cutting front has a first end extending along the feed axis in adjacent manner to the ramp and possibly associated therewith up to the deflector.

Preferentially, each knife has a cutting front arranged radially and perpendicularly with respect to the longitudinal axis of the cable or a cutting front arranged radially and extending away from the longitudinal axis of the core when movement of the sheath takes place from up-line to down-line.

According to one embodiment, said two knives are mounted fixed on two supports, in association with adjustment means of the two supports configured to define a value of first separating distance between the two knives.

According to another embodiment, the ramps are mounted fixed on associated knives.

According to one development, the device for separating a core and a sheath of a cable may comprise only two knives arranged to form two identical portions of the sheath.

Advantageously, the cutting zones of the two knives belong to a vertical plane.

In a preferential configuration, the deflectors are mounted pressing on the knives to define a through hole delineated by the deflectors and the ramps.

In another development, the knives and the deflectors are mounted on a ring designed so that the core passes through the centre of the latter, the deflectors moving the portions of the sheath towards the outer part of the ring.

In a particular configuration, the device comprises a centring device fitted between apparatus configured to deliver the cable and at least two knives, the centring device comprising at least one guide mounted perpendicularly movable with respect to the cable feed axis to shift the longitudinal axis of the cable with respect to at least two knives.

In advantageous manner, apparatus configured to supply the cable applies a pressure on the cable by means of two rotary rollers, the pressure being configured to deform the sheath and make the shape of the sheath uniform.

In another development, apparatus has two rotary rollers having a V-shaped groove. Apparatus applies a pressure configured to deform the sheath and to provide two diametrically opposite first the sheath zones having a larger thickness than two diametrically opposite second the sheath zones, the two first the sheath zones having an offset of 90° with respect to the two second the sheath zones, the two knives being arranged to cut the sheath in the two first the sheath zones.

It is a further object of the invention to provide a method for separating the core and the sheath of a cable that can be easily implemented and that reduces or even eliminates transfer of pollutants between the sheath and the core of the cable when the separation is performed.

The method successively comprises:
providing a cable provided with a sheath surrounding a core, the cable running along a feed axis parallel to a longitudinal axis of the cable and with a feed direction,
cutting the sheath over its whole thickness by means of at least two knives to form at least two portions of the sheath mechanically dissociated from one another, the two knives extending in a first radial direction with respect to the longitudinal axis of the cable,
making each portion of the sheath slide on at least one ramp extending from at least two knives to keep the portions of the sheath separated from one another and to strip the sheath from the core, and to secure the core along the cable feed axis, the ramp having an outer surface extending away from the cable feed axis in the feed direction of the cable to separate the core and the portion of the sheath when the cable runs along the feed axis,
possibly making each portion of the sheath slide on a deflector to move the portions of the sheath in a second direction perpendicular to the first direction and to the cable feed axis, the core passing on one side of the deflector and the sheath on the other side of the deflector.

BRIEF DESCRIPTION OF THE DRAWINGS

Other advantages and features will become more clearly apparent from the following description of particular embodiments and implementation modes of the invention given for non-restrictive example purposes only and represented in appended drawings, in which.

DESCRIPTION OF THE EMBODIMENTS

Figure 1:
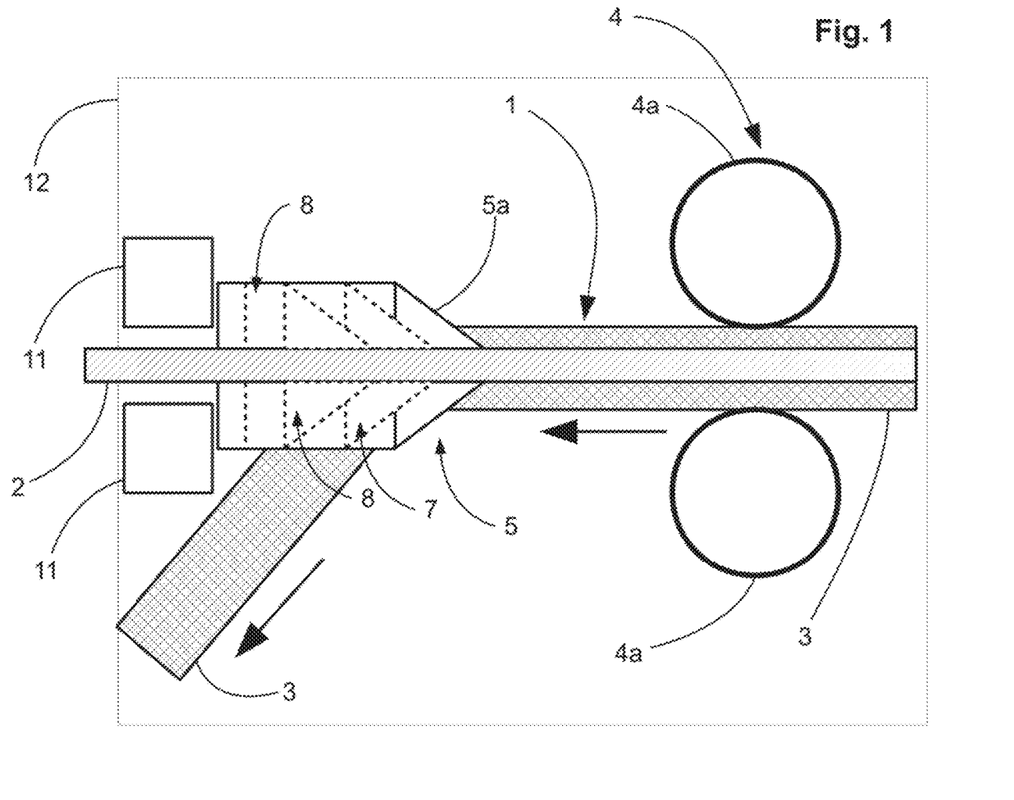
FIG. 1 schematically illustrates a transverse cross-sectional view of an embodiment of a device for separating a core and a sheath of a cable according to the invention.

FIG. 1 schematically represents a device for separating a core 2 and a sheath 3 of a cable 1. The cable 1 has a core 2 and a sheath 3 surrounding the core 2. The cable 1 presents a substantially circular cross-section with a core 2 that advantageously presents a circular or other cross-section. The sheath 3 is in the form of a ring surrounding the core 2, The cable 1 has a longitudinal axis that represents the largest dimension of the cable 1. The core 2 of the cable 1 can be formed by different wires, for example electric wires that also comprise a core made from metallic material coated with a specific the sheath. The cable 1 has a central axis which is the central axis of the core 2 and which corresponds to or is parallel to the longitudinal axis of the core 2 and therefore of the cable 1.

The device comprises an apparatus 4 configured to deliver the cable 1 along a cable feed axis. The feed axis of the cable 1 is parallel to the longitudinal axis of the cable and corresponds to the central axis of the cable 1. The apparatus 4 is configured to deliver the cable 1 in a feed direction of the cable 1 that sends the cable 1 to an outlet of the device via a cutting zone and then through a separating zone of the core 2 and the sheath 3. The apparatus 4 can be formed by any suitable means enabling the cable 1 to be made to run in the direction of the outlet. It is particularly advantageous to provide for the apparatus 4 to have two wheels or rollers 4a driven in rotation by a motor. Rotation of the rollers 4a makes the cable 1 move towards the outlet. In an advantageous configuration illustrated in FIG. 3, the surface of the rollers 4a is structured, for example with grooves, for the cable 1 to be driven easily by the rollers 4a. Advantageously the rollers 4a compress the cable 1 to facilitate movement of the latter.

The device for separating the core 2 and the sheath 3 of a cable 1 has cutting means in the form of at least two knives 5. Depending on the configurations, the device may have only two knives 5 as illustrated in the figures, but it can also have more than two knives 5. The knives 5 are arranged down-line from the apparatus 4 (in the running direction of the cable 1) to receive the cable 1. The knives 5 are arranged to cut the sheath 3 and to form at least two portions of the sheath 3 mechanically dissociated from one another. The portions of the sheath 3 are mechanically secured to one another by means of the portion of the sheath 3 that has not yet been cut.

The knives 5 and the apparatus 4 are arranged so as to feed the cable 1 along the feed axis to the cutting area which places the sheath 3 facing cutting fronts 5a of the knives 5 (in the feed direction) so that the whole of the thickness of the sheath 3 is cut to form at least two portions of the sheath 3.

In a preferential configuration, the apparatus 4 is configured to straighten the cable 1. It is apparent that when it was installed and/or removed, the cable 1 was deformed, damaged, crushed, turned or wound which has the effect of modifying its external shape which can also modify the thickness of the sheath 3. The cable 1 to be opened no longer has a circular shape over its whole length and the thickness of the sheath 3 varies from one place to another. It is therefore particularly advantageous to straighten the cable 1 so that it exits from the apparatus 4 to define a straight or substantially straight the cable with a shape that is substantially uniform over the length to be cut. It is particularly advantageous to apply a sufficient compressive stress to deform the sheath 3. The stress to be applied is greater than the stress required to obtain a good friction between the rollers 4a and the cable 1 to ensure driving of the cable 1 while at the same time being lower than the pressure which would result in the cable 1 being destroyed or blocked between the rollers 4a. The deformation is advantageously a plastic deformation. An elastic deformation can be envisaged if the sheath is still deformed when it reaches the knives 5.

It is advantageous to use the rollers 4a defining a groove designed to receive the cable 1 as a flat roller tends to deform the cable 1 which makes the cutting operation more complicated. The groove can be V-shaped, U-shaped or of any other shape suitable for receiving the cable 1. The shape of the groove is observable in a radial cross-sectional direction.

The U shape and more particularly the semi-circular shape is advantageous to ensure feed of a cable 1 of circular cross-section but this requires the provision of a groove shape suitable for each diameter of the cable 1. The use of a V-shaped groove makes it easier to adapt to the cables 1 having different diameters. When the rollers 4a have a V-shaped groove, it is advantageous to apply a stress on the cable 1 by means of the rollers 4a to deform the sheath 3 so as to have two thicker and diametrically opposite first the sheath 3 zones and two second the sheath 3 zones that are less thick and also diametrically opposite. The thicker zones are offset by 90° with respect to the less thick zones. This pressure applied on the cable 1 can enable the core 2 to be moved with respect to the sheath 3. This reduces the risks of sticking between the core and the sheath and can make the cutting and separating operation between the core and the sheath easier to perform. The value of the pressure depends on the characteristics of the cable 1. The value of the pressure applied on the cable can be defined by any suitable means and in particular by defining the distance separating the two rollers 4a.

It is particularly advantageous to perform cutting of the sheath 3 by means of two knives 5 in the zone where the thickness of the sheath 3 is the largest, Each knife 5 comprises a cutting front 5a extending in a first direction. The first direction extends in radial manner with respect to the central axis of the cable 1 to cut the sheath 3 over its whole thickness. Considering that the cable 1 is of circular cross-section, cutting faces 5a are arranged along radiuses extending from the central axis of the cable 1. In this way, when the apparatus 4 moves the cable 1 towards the outlet, the sheath 3 comes into contact with the cutting front. The pressure applied by the cable 1 by means of the apparatus 4 results in the sheath 3 being cut over its whole thickness. It is advantageous not to form more than five portions of the sheath 3 to facilitate control of the movements of the portions of the sheath with respect to the core 2.

In the prior art, it is proposed to partially cut the thickness of the sheath to form a groove and to then stretch the sheath to form two portions of the sheath mechanically separated from one another and to separate the sheath and the core. The groove acts as a dust receptacle, in particular when it is in movement. Separation of the sheath and the core is performed by tearing the sheath and, when this tearing is performed, the contamination can migrate to the core. In the prior art, it is also proposed to cut the sheath while leaving the latter in contact with the core before performing separation by deformation of the sheath. There again, the contamination of the sheath can migrate to the core before effective separation of the core and the sheath is achieved. On the contrary, according to the invention, the knives 5 cut the sheath 3 over its whole thickness to form portions of the sheath 3 that are mechanically dissociated thereby facilitating separation of the core 2 and the sheath 3 thus reducing the risks of migration of the contamination.

In advantageous manner, at least two knives 5 comprise two knives 5 with a cutting front 5a situated in the same plane perpendicular to the cable feed axis which enables the different portions of the sheath to be cut simultaneously and makes it easier to keep the core aligned along the feed axis. It is particularly advantageous to provide for cutting fronts 5a of the two knives 5 to be contained in a vertical plane. The two portions of the sheath 3 can slide with respect to the core 2 on account of their weight. The portions of the sheath 3 are stripped naturally from the core 2. The portions of the sheath do not press on the top of the core 2 which reduces the risks of transmission of pollutants from the portions of the sheath. It is then preferable to use the rollers 4a arranged to have the largest thicknesses of the sheaths in a vertical cross-sectional plane. The rollers 4a can be arranged horizontally and not vertically as in FIG. 3. Axes of rotation of the rollers 4a are vertical or substantially vertical.

Figure 2:
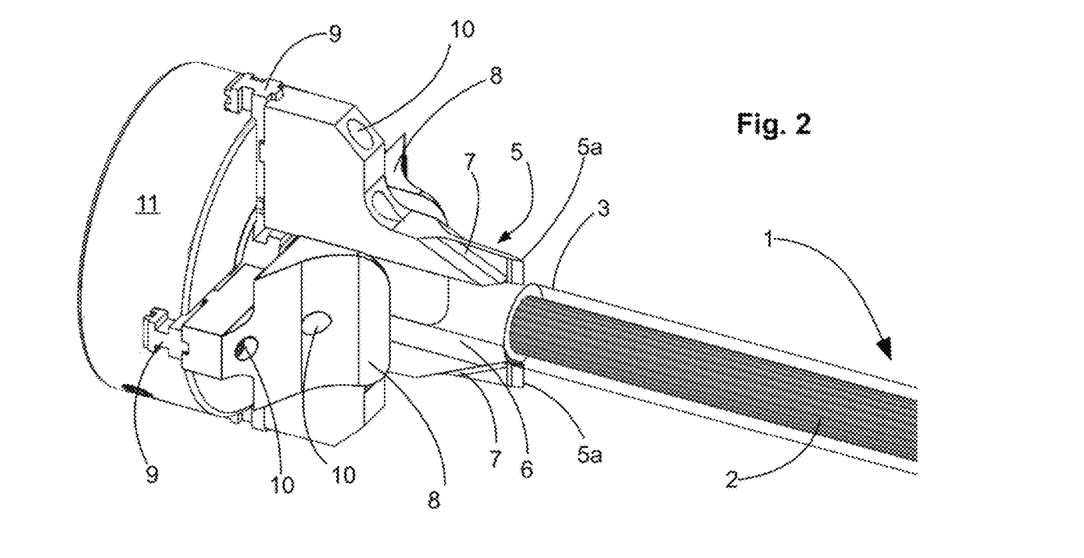
FIG. 2 schematically illustrates a side view of the knives associated with the blockers, ramps and deflectors of a device for separating a core and a sheath of a cable illustrated in FIG. 1.
Figure 3:
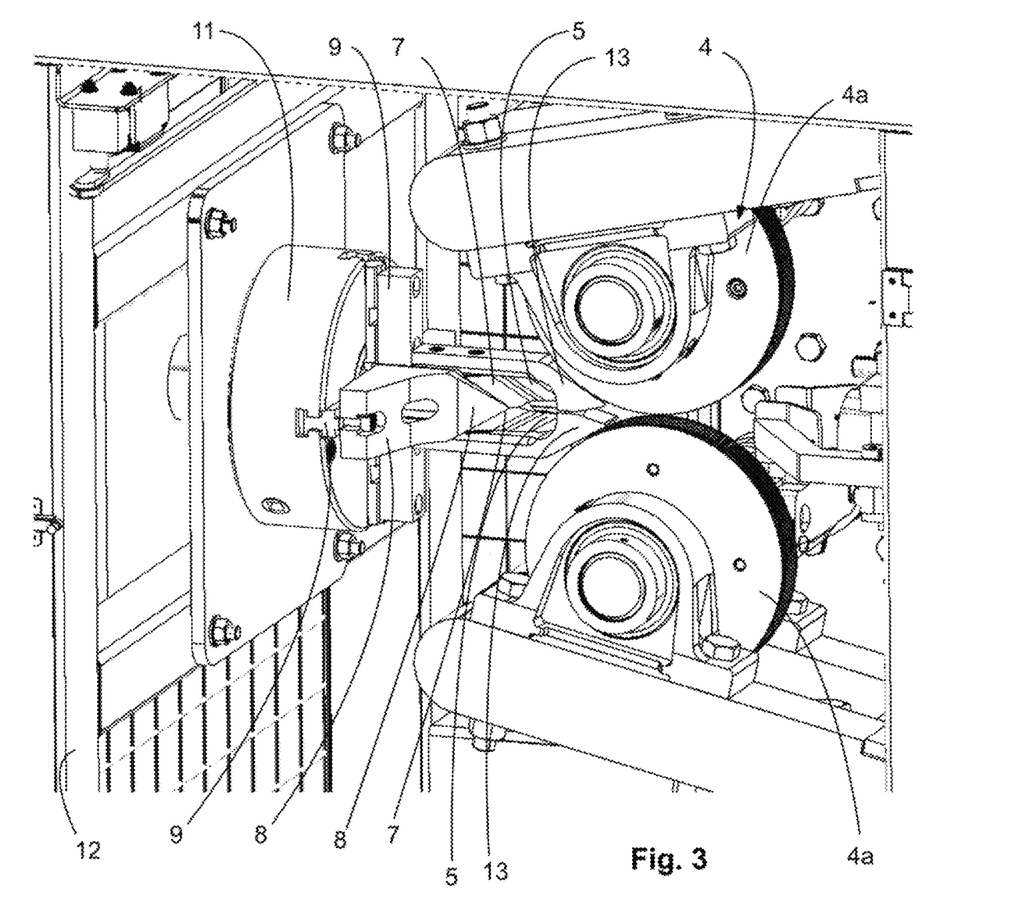
FIG. 3 schematically illustrates a side view of an embodiment of a device for separating a core and a sheath of a cable in an enclosure.

In the configurations illustrated in FIGS. 2 and 3, different shapes of cutting front 5a can be used. Different shapes of cutting front 5a are possible with notably a cutting front 5a that is included in a plane perpendicular to the feed axis of the cable 1 as illustrated in FIG. 2. In an alternative embodiment, cutting front 5a is inclined with respect to a plane perpendicular to the feed axis of the cable 1. In this way, the cutting force over the whole thickness of the sheath 3 is distributed over a larger travel distance of the cable 1.

In advantageous manner, the cutting front moves away from the cable feed axis and therefore from the core 2 when movement of the sheath 3 takes place from up-line to down-line as illustrated in FIGS. 1 and 3. In other words, cutting front 5a performs cutting of the sheath 3 from the inner surface to the outer surface.

In an alternative embodiment, cutting front 5a can be V-shaped with a reduction of the distance separating the two opposite parts of cutting front 5a increasing progressively as the cable 1 moves towards the outlet. These configurations are particularly advantageous as cutting front 5a does not push on the outer surface of the sheath 3 against the core 2 to achieve cutting of the sheath 3. Cutting front 5a can be more or less tapered perpendicular to the first direction and the central axis to take account of the mechanical properties of the sheath 3 and separate the two adjacent portions of the sheath 3.

When the outer surface of the sheath 3 is soiled, for example with radioactive dusts, by pushing the outer surface of the sheath 3 against the core 2 to cut the sheath 3, the probability of displacing the dusts and other impurities onto the core 2 is increased. Cutting of the sheath 3 from the outside to the inside is also more complicated when the core 2 is not rigid and deforms due to action of the stress applied by the cutting means.

It is therefore particularly advantageous to have a cutting front 5a that is perpendicular or directed from the inside to the outside to reduce the transfer of contamination when movement takes place from up-line to down-line. Transfer of dust is nil or almost nil when cutting of the sheath 3 is performed starting from the interface with the core 2 towards the outer surface of the sheath 3.

This solution is more advantageous than the one proposed in the prior art where a laser beam is configured to melt the material forming the sheath. The soiled the sheath is melted thereby conveying the dusts from the outside to the inside following the melting front.

The knives 5 are advantageously arranged at equal distance from the central axis of the cable 1 at a value that preferably corresponds to the radius of the core 2 to ensure that the whole of the thickness of the sheath 3 is cut.

It is advantageous for cutting fronts 5a to be arranged in such a way as to cut the sheath 3 simultaneously and preferentially for cutting fronts 5a to have the same shape and incline with respect to the feed axis of the sheath 3. The document CN107482541 proposes a single cutting front of the sheath which tends to make the cable fold, and it is necessary to use take-up wheels to place the cable back in the right position before performing dissociation of the sheath 3 and the core 2. When the sheath 3 is polluted, the pollution deposits on the wheels which transport the pollution all along the cable and possibly into the groove formed in the sheath up to the core.

Once the portions of the sheath 3 have been formed, it is particularly advantageous for the core 2 mechanically dissociated from the sheath 3 not to deform on account of the modification of the mechanical connection between the core 2 and the sheath 3. It is particularly advantageous to use at least two blockers 6 extending at least two knives 5 along the cable feed axis. At least two blockers 6 are configured to keep the core 2 aligned along the cable feed axis. In this way, the core 2 oriented along the feed axis at the time cutting is performed remains substantially oriented along the same axis making continuation of cutting over the whole length of the cable easier to perform. However, when the mechanical properties of the core allow, blocker 6 is not necessary.

It is particularly advantageous to use two blockers 6 extending from the two knives 5 along the cable feed axis. In the illustrated embodiment, the two blockers 6 are diametrically opposite with respect to the central axis of the cable 1 when cutting is performed. Blockers 6 are separated from the central axis of the core 2 by a distance equal to or very slightly larger than the radius of the core 2 to maintain the orientation of the core 2. Preferably, at least one blocker 6 is located vertically underneath the cable feed axis to prevent the core 2 from deforming under its own weight.

To separate the core 2 and at least two portions of the sheath 3, it is advantageous to use at least two ramps 7. The ramps 7 prevent the portions of the sheath 3 from converging and prevent the sheath 3 from reverting substantially to its initial shape, i.e. its shape before the cutting step due to a memory effect of the sheath 3. It is advantageous to provide for the ramps 7 to be configured to modify the directions of travel of the portions of the sheath 3 and in this way to no longer follow a direction of travel parallel to the central axis of the core 2. The portions of the sheath 3 are mechanically dissociated from the core 2 which maintains its transit along the feed axis.

Each cutting front 5a is continued by at least one ramp 7 extending from each knife 5 in a second direction perpendicular to the first direction and to the feed axis of the cable 1. Each ramp 7 is configured to have an outer surface moving away from the feed axis of the cable 1 and therefore from the core 2 in the first direction when travel takes place in the feed direction of the cable 1. Each ramp 7 is advantageously configured so that the distance between the two outer surfaces of the two opposite ramps is larger than the diameter of the core 2.

For example, the up-line end of ramp 7 is located in the extension of the inner part of cutting front 5a, i.e. right next to the core 2, so that the portion of the sheath 3 on outlet from knife 5 presses on ramp 7 and moves progressively away from the core 2 as it travels to the outlet. However, it is also possible for ramp 7 to extend in several directions in order to define a separator between the core 2 and the sheath 3.

Ramp 7 is placed in immediate proximity to cutting zone 5a so that, when movement of the portions of the sheath 3 takes place, the direction of travel of the core 2 is partly linked to the direction of travel imposed by the complete the cable 1, i.e. association of the sheath 3 and the core 2. In this way, as the cable 1 progressively moves in the direction of the outlet, the portion of the sheath 3 moves away from the core 2 at least up to a threshold distance.

In other words, the portions of the sheath 3 that have been mechanically released from the core 2 come into contact with the ramps 7 that extend from the knives 5. The orientation of the ramps 7 tends to push the portion of the sheath 3 away from the core 2 when the apparatus 4 pushes the cable 1 towards the outlet.

In advantageous manner, ramp 7 is mounted fixed on associated knife 5 which facilitates is positioning with respect to the cutting surface. In this way, once cutting front 5a has been positioned with respect to the central axis of the core 2 and with respect to the inner surface of the sheath 3, the up-line part of ramp 7 is automatically positioned with respect to the portion of the sheath 3 that will be formed.

It is advantageous to provide for the up-line front of ramp 7, i.e. the first part that comes into contact with the core 2 and/or with the sheath 3, to be located at the same distance from the central axis as the bottom end of knife 5, i.e. the end nearest the core 2.

It is also advantageous to provide for knife 5, blocker 6 and ramp 7 to be formed in a single piece or by a monolithic part.

In an advantageous embodiment, two ramps 7 are arranged on each side of the knives 5 so that each lateral end of a portion of the sheath 3 comes into contact with a ramp 7. By using the knives 5 associated with two ramps 7, the two lateral ends of the portion of the sheath 3 are moved by the ramps 7 which tends to stretch the sheath 3 and force the portion of the sheath 3 to deform to move away from the core 2 and reduce the transfer of pollution to the core 2.

It is also advantageous to use at least two deflectors 8 arranged down-line from at least two ramps 7 and having an outer surface extending away from the core 2 when the feed direction of the cable 1 is followed. The outer surface of the deflectors 8 is advantageously more pronounced than the ramp 7 to move the sheath 3 in the second direction. However, the weight of the portions of the sheath 3 can be sufficient to finish displacement of the sheath 3 a large distance away from the core 2.

Once the ramps 7 have started to deform the portions of the sheath 3, to prevent the portions of the sheath 3 from returning to their initial position, it is advantageous to divert the latter definitively from the core 2 by means of deflectors 8. The deflectors 8 accentuate the movement of the portions of the sheath 3 in the second direction thereby enabling the portion of the sheath 3 to be definitively stripped from the core 2.

This configuration is particularly advantageous as it enables separation of the core 2 and the sheath 3 to be achieved gently without stressing the core 2. In the prior art configurations where the portions of the sheath 3 are not mechanically dissociated from the core 2 in the cutting step, it is necessary to pull on the core 2 and on the sheath 3 to achieve separation. This means that a gripping means has to be provided on the core or imposes manual initiation of the separation operation. The document FR 2728735 proposes using a frustum-shaped separating means that is inserted between the core and the sheath to tear the sheath and strip the latter from the core. This solution assumes that the sheath is not damaged or that the weakening performed by the laser beams defines the breaking zone. This configuration also requires the sheath and the core to push against the frustum-shape separator with a sufficient force to perform tearing of the sheath whereas the sheath is heated and has been weakened by the grooves formed by the laser beams.

The knives 5 perform complete cutting of the whole thickness of the sheath 3. The sheath 3 is deformed and stripped slightly from the core 2 at least due to the effect of the knives 5 which allows a greater freedom in the placement of the ramps 7 to move the sheath 3 far away from the core 2.

In an advantageous configuration, at least two knives 5 comprise two knives 5 having their cutting zone 5a in the same plane. In other words, the two cutting surfaces 5a are arranged along a diameter of the cable 1. The two knives 5 are separated by a first separating distance that advantageously corresponds to the diameter of the core 2 or to the inner diameter of the sheath 3, and the ramps 7 are preferentially separated by the first separating distance so that it is easier for the latter to come into contact with the portions of the sheath 3.

In the embodiments illustrated in FIGS. 2 and 3, each knife 5 is extended by a flat surface parallel to the feed axis of the cable 1 and designed to receive the core 2 to form blocker 6.

In preferential manner, the blockers 6 extend over a distance that is equal to at least a radius of the core 2 to ensure that the core is well secured and that is preferably smaller than the inner diameter of the sheath 3.

As indicated in the foregoing, it is advantageous to provide for each knife 5 to have a cutting front 5a arranged radially and perpendicularly with respect to the feed direction of the cable or a cutting front 5a moving away from the core 2 of the cable 1 in the cable feed direction. The knives 5 can have a different shape from one another, but it is advantageous to provide substantially the same cutting force of the knives 5 on the sheath 3 in order not to change the orientation of the cable 1.

It is advantageous to provide a particular configuration in which the two diametrically opposite knives 5 are mounted fixed on two supports 9. The device for separating a core 2 and a sheath 3 of a cable 1 comprises adjustment means 10 of the two supports 9 configured to define a first separating distance between the two knives 5. It is then possible to adjust the position of the knives 5 to match the diameter of the cable 1 and more particularly the diameter of the core 2 to ensure a good separation between the core 2 and the sheath 3. This solution is significantly more advantageous than the frustum-shaped separator of the prior art. Adjustment means 10 of the two supports 9 can be formed by screws blocking the supports 9 in the selected position.

When the knife 5, the blocker 6 and the ramp or the ramps 7 are formed in a single piece or by a monolithic part, the position of the adjustment means 10 simply has to be adjusted to simultaneously adjust the cutting of the sheath 3, deformation of the portion of the sheath 3 and travel of the latter.

Although the adjustment means 10 are particularly advantageous when the device comprises two diametrically opposite the knives 5 and more particularly only two diametrically opposite the knives 5, it is also possible to use adjustment means with more the knives 5.

As illustrated in FIGS. 2 and 3, it is advantageous to provide for deflectors 8 to be mounted pressing on the knives 5 or the supports 9 of the knives 5 to define a through hole bounded by the deflectors 8 and the blockers 6. Once the cable 1 comes into contact with the knives 5, the core 2 moves in the feed direction up to the outlet, and the blockers 6 prevent undesired displacement of the core 2 thereby guiding the core 2 to the outlet. The deflectors 8 limit movements in the other direction. This configuration facilitates transit of the core 2 to the outlet.

It is also advantageous to provide for deflectors 8 to be mounted on adjustment means 10 which makes it possible to adjust to the cross-section of the core 2 and more particularly to the deformation of the sheath 3.

The knives 5 and the deflectors 8 can be mounted on a ring 11, the core 2 being designed to pass through the centre thereof. The centre of the ring 11 may also form the outlet. The deflectors 8 displace the portions of the sheath 3 to the outer part of the ring 11 when they leave the ramps 7.

Cutting of the sheath 3 enables the sheath 3 to be mechanically stripped from the core 2 in a single operation without stressing the core 2. When the cutting operation is performed to form only two portions of the sheath 3, the two portions of the sheath 3 are preferentially identical to avoid having to pull on the portion of the sheath 3 representing more than 50% of the surface of the core 2 thereby increasing the risk of external contamination being transposed onto the core 2.

It is also advantageous to provide a cutting front 5a of the top part of the sheath 3 that is located in the vertical median plane or substantially in the vertical median plane. This configuration prevents turning of the sheath 3, when cutting is performed, from placing the cut outer surface above the cable 1 and does not transfer its pollution. Therefore, when cutting is performed, gravity moves the portion of the sheath 3 and its pollution downwards. A similar problem can be encountered when using a frustum-shaped separator that cannot completely impose deformation of the sheath 3, with the risk of the pollution being deposited on the outer wall of the separator and sliding onto the core 2.

The device for separating the core 2 and the sheath 3 is advantageously devoid of heating means.

For example, when the cable 1 is soiled, it is advantageous to use an enclosure 12 that will confine the dusts and other impurities present on the outer surface of the sheath 3. The apparatus 4 configured to deliver the cable 1 at least two knives 5 and deflectors 6 are contained in enclosure 12 to treat the contaminated the cable. The centre of ring 11 advantageously forms an outlet of the core 2 from enclosure 12.

The apparatus 4 configured to deliver the cable 1 and in particular roller 4a is in contact with the outer surface which is contaminated/polluted. The apparatus 4 is located up-line from the cutting zone. The knives 5 move to cut the sheath 3 and can be in contact with the contaminated outer surface depending on the configuration of the cutting front.

The blockers 6 are only in contact with the core 2 which is not contaminated. The ramp 7 is arranged to come into contact with the inner surface of the sheath 3 and must not be contaminated. The ramp 7 is not in contact with the core. The ramp 7 is configured to separate the sheath 3 and the core 2.

The incline of the ramp 7 is configured so that only the inner surface of the sheath 3 presses thereon. Any possible contamination of the sheath 3 is therefore not deposited against the ramp 7.

The configuration presented prevents any unintentional contact between the core 2 and the outer surface of the sheath 3.

In order to be able to work with the cables 1 having different mechanical performances, it is advantageous to use a centring device 13 mounted between the apparatus 4 configured to deliver the cable 1 and the at least two knives 5, the centring device 13 comprises at least one guide mounted perpendicularly movable with respect to the feed axis of the cable 1 to shift the longitudinal axis of the cable 1 with respect to the at least two knives 5. In advantageous manner, the centring device 13 is mounted so as to compensate a possible deformation of the cable 1 due to gravity between the outlet of the rollers 4a and the knives 5. It is also conceivable to use the centring device 13 to deform the cable 1, but this embodiment is less advantageous than with the rollers 4a as the forces applied on the sheath 3 are strong and are directed along the longitudinal axis of the cable 1. This can result in the sheath 3 being damaged.

Figure 4:
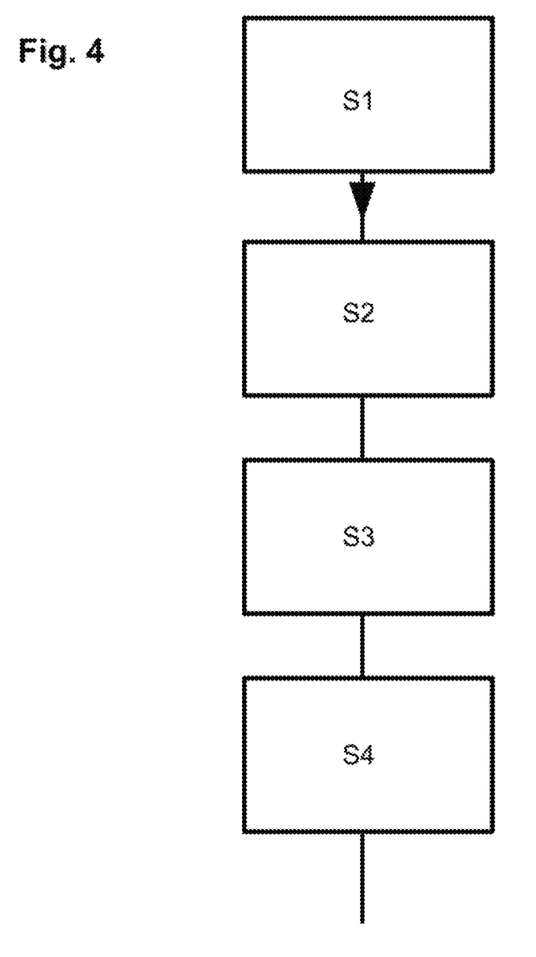
FIG. 4 schematically illustrates a method for separating the sheath and the core according to the invention.

To efficiently separate the core and the sheath of a cable 1, a method for separating the core and the sheath of a cable is proposed as illustrated in FIG. 4 and successively comprising:
- providing a cable 1 provided with a sheath 3 surrounding a core 2, the cable 1 running along a cable feed axis with a feed direction of the cable, in a step S1,
- cutting the sheath 3 over its whole thickness by means of the at least two knives 5 so as to form at least two portions of the sheath mechanically dissociated from one another, the two knives 5 extending radially from the cable feed axis in a first direction, in a step S2,
- making each portion of the sheath 3 slide on at least one ramp extending from the at least two knives 5, and keeping the core 2 aligned along the feed axis of the cable 1, the ramp 7 having an outer surface extending away from the cable feed axis in the feed direction of the cable to separate the core and the portion of the sheath when the cable runs in the first direction, in a step S3,
- possibly making each portion of the sheath 3 slide on a deflector to move the portions of the sheath in a second direction perpendicular to the first direction and to the feed axis of the cable, the core 2 passing on one side of the deflector and the sheath 3 on the other side of the deflector, in a step S4.

Once the sheath 3 has been cut in the lengthwise direction by means of the knives 5 to form the at least two portions of the sheath 3, the portions of the sheath 3 are kept at a distance from one another by means of the blockers 6 and then of the ramps 7 that increase the separating distance with the core 2. Cutting of the sheath 3 to form two mechanically separated portions dissociated from the core 2 facilitates displacement of the portions of the sheath with respect to one another and with respect to the core 2. Beginning of cutting and of stripping can be achieved without any outside intervention and without requiring a strong force on the cable 1 or prior heating of the latter to soften the sheath 3.

Figure 5:
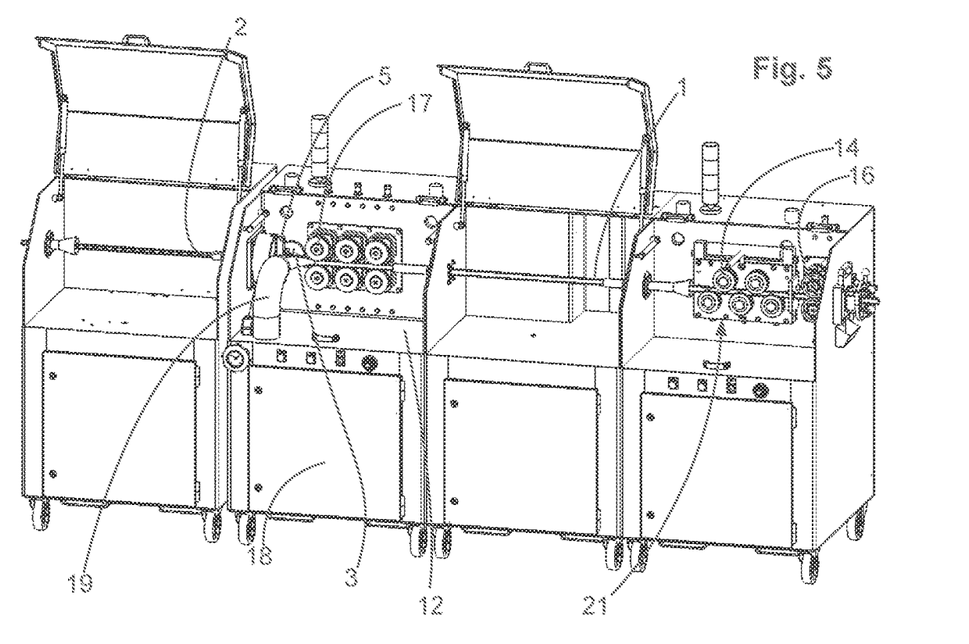
FIG. 5 schematically illustrates a device for separating a core and a sheath of a cable provided with a device for deforming the cable and with a tank to store the cable the sheath.
Figure 6:
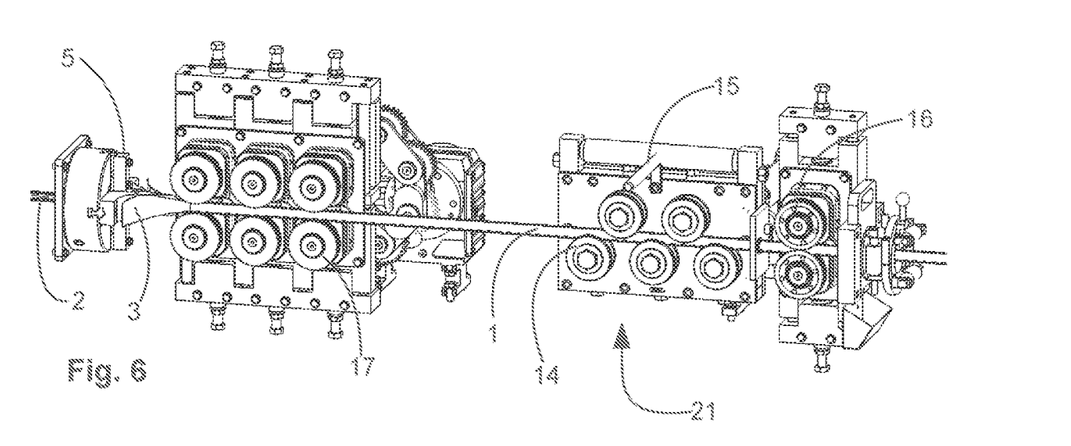
FIG. 6 schematically illustrates a device for separating a core and a sheath of a cable provided with a device for deforming the cable without shrouding.

In an advantageous embodiment illustrated in FIGS. 5 and 6, the device for separating the core 2 and the sheath 3 of a cable 1 is provided with deformation device 21 of the cable 1 that is configured to deform the cable 1 so that it presents itself in straighter manner when moving to face the knives 5. The deformation equipment acts as a straightening device of the cable. The deformation device 21 of the cable 1 has a first series of rollers 14, for example at least three rollers 14, that are arranged consecutively along the path of the cable 1. The three rollers of the first series of rollers 14 come in the form of at least two first rollers arranged on a first side of the cable and at least a second roller arranged on the other side of the cable 1, in the embodiment there are five rollers arranged as three first rollers and two second rollers. The cable 1 runs alternately from a first roller to a second roller. In preferential manner, the rollers of the first series of rollers 14 have axes of rotation that are parallel.

When the cable 1 runs from the inlet zone up to the knives 5, the cable 1 is subjected to several consecutive, differently-oriented strain forces, for example several flexural stresses. The consecutive strain forces in different directions enable the shape of the cable 1 to be better defined to present the latter to the knives 5. This configuration is more advantageous than a deformation device that only has a single pair of rollers mounted facing one another perpendicularly to the longitudinal axis of the cable.

It is particularly advantageous to provide for the deformation device 21 to comprise a first series of rollers 14 and a second series of rollers (not shown) that are oriented differently, i.e. that have non-parallel axes of rotation, for example axes of rotation perpendicular to one another.

In an embodiment that is not illustrated, the cable deformation device 21 comprises a first series of rollers 14 that present a first orientation and a second series of rollers that present a second orientation perpendicular to the first orientation. This configuration is particularly advantageous to straighten the cable 1 before reaching the knives 5. Advantageously, the device comprises adjustment means 15 of the compressive stress of the first series of rollers 14 and/or of the second series of rollers. The compressive stress can be adjusted by modifying the distance separating the first rollers from the second rollers for each series. The rollers of the deformation device 21 are preferentially smooth rollers.

In a preferential embodiment, the deformation device 13 device 21 of the cable is arranged between a first drive device 16 of the cable and a second drive device 17 of the cable. The two drive devices of the cable are separated by the deformation device 21 in the feed direction of the cable 1. The rollers of the drive devices 16 and 17 are preferentially textured rollers to enhance driving of the cable 1. The cable 1 is preferentially drawn between the two drive devices 16 and 17. It is advantageous for the second drive device 17 to present several pairs of rollers to straighten the cable by straining the cable 1.

In order to limit circulation of a contaminant that may be present on the surface of the sheath 3, it is advantageous to provide for the device for separating the sheath 3 and the core 2 of the cable 1 to comprise one or more tanks 18 designed to receive the portions of the sheath 3. The Tank or tanks 18 are connected to the separating zone by several pipes 19. In advantageous manner, the tank or tanks 18 are only connected to the cutting zone by the pipe or pipes 19 so that the contamination present on the surface of the sheath 3 remains very far from the core 2.

In advantageous manner, the inlet of the pipe 19 is located in the extension of the lateral surfaces of the knives 5 and if applicable of a deflector 6 so that the portion of the sheath 3 that has just been cut moves naturally along the knives 5 and then along deflectors to the inlet of the pipe. Once the portion of the sheath 3 is in the pipe, it is pushed by the drive means to tank 18. In this way, the cable 1 can be cut and the sheath 3 be installed in tank 19 without any human intervention. After the sheath 3 has been cut, the deflector deforms the portion of the sheath 3 to direct the latter to the inlet of the pipe 19 which limits the possibilities of displacement of the portion of the sheath 3 that has to follow the pipe 19 up to the tank 18.

To limit transfer of the contamination, it is advantageous for the tank 18 to be located lower than the cutting area. Once the portion of the sheath 3 has been installed in the pipe 19, gravity attracts the portion of the sheath 3 towards the tank 18. It is advantageous to have the two pipes 19 separated by the core 2 so as to recover two portions of the sheath 3.

This embodiment enables the core 2 and the sheath 3 of the cable 1 to be separated without any fear of the portions of the sheath 3 remaining stuck in the cutting zone, folding onto themselves and ending up by coming into contact with the core 2 after separation. In the particular embodiment illustrated in FIG. 5, the tank 18 is located underneath the cutting zone and/or underneath the separating zone.

The invention claimed is:

1. Device for separating a core and a sheath of a cable, comprising:
   an apparatus configured to feed the cable along a feed axis parallel to a longitudinal axis of the cable up to an outlet passing between at least two knives,
   the at least two knives being configured to cut the sheath over its whole thickness and to form at least two portions of the sheath mechanically dissociated from one another, each knife comprising a cutting front extending in a first radial direction with respect to the longitudinal axis of the cable to cut the sheath,
   at least two ramps extending from the at least two knives, the at least two ramps being configured to maintain the separation between the at least two portions of the sheath and to mechanically separate the sheath and the core up to the outlet by modifying the movement path of the at least two portions of the sheath differently with respect to the feed axis, and
   at least two deflectors arranged down-line from the at least two ramps to receive the portions of the sheath, the at least two deflectors having an outer surface modifying the direction of movement of the portions of the sheath perpendicularly to the longitudinal axis of the core.

2. Device for separating a core and a sheath of a cable according to claim 1, wherein the at least two knives comprise two knives having a cutting front in the same plane, said two knives being separated by a first separating distance, and the ramps have a contact surface designed to receive the portion of the sheath on outlet from the knives, the contact surface being oriented so as to move away from the longitudinal axis of the core when movement of the sheath takes place from up-line to down-line.

3. Device for separating a core and a sheath of a cable according to claim 2, wherein said two knives are mounted fixed on two supports in association with adjustment devices configured to move the two supports and configured to define a value of first separating distance between the two knives.

4. Device for separating a core and a sheath of a cable according to claim 2, comprising only two knives arranged to form two identical portions of the sheath.

5. Device for separating a core and a sheath of a cable according to claim 2, wherein the cutting zones of the two knives belong to a vertical plane.

6. Device for separating a core and a sheath of a cable according to claim 1, wherein each cutting front has a first end extending along the feed axis in adjacent manner to the ramp and possibly associated therewith up to the at least two deflectors.

7. Device for separating a core and a sheath of a cable according to claim 1, wherein each knife has a cutting front arranged radially and perpendicularly with respect to the longitudinal axis of the cable or a cutting front arranged radially and extending away from the longitudinal axis of the core when movement of the sheath takes place from up-line to down-line.

8. Device for separating a core and a sheath of a cable according to claim 1, wherein the at least two ramps are mounted fixed on associated at least two knives.

9. Device for separating a core and a sheath of a cable according to claim 1, wherein the at least two deflectors are mounted pressing on the at least two knives to define a through hole delineated by the at least two deflectors and the at least two ramps.

10. Device for separating a core and a sheath of a cable according to claim 1, wherein the at least two knives and the at least two deflectors are mounted on a ring designed so that the core passes through the centre of the ring, the at least two deflectors moving the portions of the sheath towards the outer part of the ring.

11. Device for separating a core and a sheath of a cable according to claim 1, comprising a centring device fitted between an apparatus configured to deliver the cable and the at least two knives, the centring device comprising at least one guide mounted perpendicularly movable with respect to the cable feed axis to shift the longitudinal axis of the cable with respect to the at least two knives.

12. Device for separating a core and a sheath of a cable according to claim 11, wherein the apparatus configured to feed the cable applies a pressure on the cable by means of two rotary rollers, the pressure being configured to deform the sheath and make the shape of the sheath uniform.

13. Device for separating a core and a sheath of a cable according to claim 12, wherein the apparatus has two rotary rollers having a V-shaped groove and wherein the apparatus applies a pressure configured to deform the sheath and to provide two diametrically opposite first the sheath zones having a larger thickness than two diametrically opposite second the sheath zones, the two first sheath zones having an offset of 90° with respect to the two second the sheath zones, the two knives being arranged to cut the sheath in the two first the sheath zones.

14. Method for separating a core and a sheath of a cable successively comprising:
- providing a cable provided with a sheath surrounding a core, the cable running along a feed axis parallel to a longitudinal axis of the cable and with a feed direction,
- cutting the sheath over its whole thickness by means of at least two knives to form at least two portions of the sheath mechanically dissociated from one another, the two knives extending in a first radial direction with respect to the longitudinal axis of the cable,
- making each portion of the sheath slide on at least one ramp extending from the at least two knives to keep the portions of the sheath separated from one another and to strip the sheath from the core, and to secure the core along the cable feed axis, the at least one ramp having an outer surface extending away from the cable feed axis in the feed direction of the cable to separate the core and the portion of the sheath when the cable runs along the feed axis,
- making each portion of the sheath slide on a deflector to move the portions of the sheath in a second direction perpendicular to the first direction and to the cable feed axis, the core passing on one side of the deflector and the sheath on the other side of the deflector.

* * * * *